(12) United States Patent
Dotzel et al.

(10) Patent No.: US 8,992,093 B2
(45) Date of Patent: Mar. 31, 2015

(54) WHEEL BEARING OF AN AIRCRAFT LANDING GEAR

(75) Inventors: Torsten Dotzel, Euerbach (DE); Robin Lang, Bundorf (DE); Christian Proeschel, Wuerzburg (DE); Wilhelm Sebald, Bad Koenigshofen (DE); Gerhard Kreiselmeier, Dittelbrunn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 540 days.

(21) Appl. No.: 12/676,149

(22) PCT Filed: Aug. 27, 2008

(86) PCT No.: PCT/DE2008/001430
§ 371 (c)(1),
(2), (4) Date: Mar. 31, 2010

(87) PCT Pub. No.: WO2009/030200
PCT Pub. Date: Mar. 12, 2009

(65) Prior Publication Data
US 2010/0202719 A1 Aug. 12, 2010

(30) Foreign Application Priority Data
Sep. 6, 2007 (DE) .......................... 10 2007 042 369

(51) Int. Cl.
*F16C 13/00* (2006.01)
*F16C 19/40* (2006.01)
(Continued)

(52) U.S. Cl.
CPC ................. *B64C 25/36* (2013.01); *B60B 27/02* (2013.01); *F16C 19/54* (2013.01); *B60B 27/001* (2013.01); *B60B 27/0052* (2013.01); *B60B 27/0073* (2013.01)
USPC .............................. 384/589; 384/551; 301/6.2

(58) Field of Classification Search
CPC ......... F16C 19/54; F16C 35/12; B64C 25/36; B60B 27/02; B60B 27/001
USPC ......... 384/517, 520, 551, 555, 560, 561, 563, 384/564, 585, 589; 301/6.2, 9.1, 10.1, 301/105.1
See application file for complete search history.

(56) References Cited

U.S. PATENT DOCUMENTS 1,950,592 A * 3/1934 Bock .............................. 384/589
2,048,442 A * 7/1936 Frank ............................. 301/6.2

(Continued)

FOREIGN PATENT DOCUMENTS

JP          05162502 A  *  6/1993

OTHER PUBLICATIONS

Machine translation of JP 05162502 A obtained on Mar. 14, 2014.*

*Primary Examiner* — James Pilkington
*Assistant Examiner* — Adam D Rogers
(74) *Attorney, Agent, or Firm* — Simpson & Simpson, PLLC

(57) ABSTRACT

A wheel bearing for aircraft, that has a long service life and is reliable. The wheel bearing has a small number of individual parts and components that are simple to handle, to mount or to dismount. The wheel bearing of an aircraft landing gear has a wheel rim that is rotationally mounted about an axis over two roller bearings of a bearing arrangement. The external rings of the roller bearings are received together in a single-piece external ring bearing housing. The wheel rim can be detachably connected to the bearing arrangement in such a manner that it can be mounted or dismounted independently from the bearing arrangement.

6 Claims, 9 Drawing Sheets

(51) Int. Cl.
  *B60B 37/00* (2006.01)
  *B64C 25/36* (2006.01)
  *B60B 27/02* (2006.01)
  *F16C 19/54* (2006.01)
  *B60B 27/00* (2006.01)

(56) References Cited

U.S. PATENT DOCUMENTS

| | | | |
|---|---|---|---|
| 2,406,068 A | 8/1946 | Frederick | |
| 2,834,636 A * | 5/1958 | Fawick | 301/6.2 |
| 2,998,282 A | 8/1961 | Edward | |
| 3,836,201 A * | 9/1974 | Stimson et al. | 301/6.2 |
| 5,086,821 A * | 2/1992 | Russell et al. | 152/410 |
| 5,096,310 A * | 3/1992 | Meining et al. | 384/539 |
| 5,402,865 A * | 4/1995 | Harker | 188/71.5 |
| 5,492,419 A * | 2/1996 | Miller et al. | 384/551 |
| 5,641,239 A * | 6/1997 | Michalek | 403/397 |
| 6,615,958 B1 | 9/2003 | Baden | |
| 7,255,208 B2 * | 8/2007 | Rea | 188/264 G |
| 7,393,064 B2 * | 7/2008 | Hall et al. | 301/105.1 |
| 7,537,390 B2 * | 5/2009 | De Boer et al. | 384/504 |
| 8,444,324 B2 * | 5/2013 | Proeschel et al. | 384/589 |
| 8,668,276 B2 * | 3/2014 | Hall et al. | 301/6.2 |

* cited by examiner

WHEEL BEARING OF AN AIRCRAFT LANDING GEAR

CROSS-REFERENCE TO RELATED APPLICATIONS

This application is a 371 of PCT/DE2008/001430 filed Aug. 27, 2008, which in turn claims the priority of DE 10 2007 042 369.3 filed Sep. 6, 2007, the priority of both applications is hereby claimed and both applications are incorporated by reference herein.

BACKGROUND OF THE INVENTION

The invention lies in the field of landing gear for aircraft, in particular freight aircraft and commercial aircraft. In this area of use, various, partially inverse, optimization criteria have to be met. For example, landing gear of this type and therefore wheel bearings are loaded only briefly in relation to the overall operating period of the aircraft but, in these phases, are extremely highly loaded. During these loading phases, the wheel bearings must operate with the maximum reliability, absorb extreme forces and torques—for example during the braking operation following the landing—and must nevertheless be as lightweight and as low-maintenance as possible.

With regard to the maintenance, in particular to the bearing and brake inspection/renewal, it is desirable to be able to use standard bearings but nevertheless to implement a high level of integration and to provide the simplest and most compact subassemblies.

Against this background, the object of the present invention consists in providing a wheel bearing for aircraft which has a long service life and reliability with the smallest possible number of individual parts and provides subassemblies which are simple to handle and to mount or dismount.

According to the invention, this object is achieved by a wheel bearing having the features of patent claim 1.

BRIEF SUMMARY OF THE INVENTION

An important aspect of the invention consists in the outer rings being held jointly by a single component, namely the outer ring bearing housing. As a result, the bearing arrangement already experiences a considerable improvement with regard to its ability to be mounted or dismounted. The bearing arrangement can advantageously be fitted with the anti-friction bearings in advance and, in a mounting process, can simply be applied to the respective load-bearing hollow axle or the bearing journal, and the rotatable part of the bearing arrangement can then be fitted with the rim later. Within the context of the present invention, the rotatable part of the bearing arrangement is to be understood to be that region of the bearing arrangement which, during operation, rotates about the wheel axle relative to the stationary bearing (e.g. the hollow axle or the bearing journal of the wheel bearing).

A further aspect of the invention consists in the rim both being joined to the rotatable part of the bearing arrangement and being configured in such a way that it can be mounted or dismounted independently of the bearing arrangement. This represents a substantial advantage, primarily with regard to the maintenance of the aircraft landing gear, in particular to the inspection and maintenance of the brake arrangement. This is because, with the wheel bearing according to the invention, the rim (possibly with the tires located thereon) can be removed simply and therefore the brake arrangement can be made accessible.

According to an advantageous refinement of the invention, the outer ring bearing housing forms the rotatable part of the bearing arrangement, on which the rim is detachably mounted. Preferably, the rim can be joined by means of appropriate screw joints to a cast-on part or an extension of the outer ring bearing housing, extending radially.

According to a refinement of the invention that is preferred in terms of mounting technology, the rim is in two parts. The two rim parts can be joined to each other in advance—for example screwed together—so that the rim overall forms a one-piece simple-to-handle unit.

According to a further advantageous refinement of the invention, the outer rings are integral constituent parts of the outer ring bearing housing, specifically in that the anti-friction bearing outer rings are formed from the material of the bearing housing. This further reduces the number of individual parts to be mounted.

As is known, specific bearing types, for example tapered roller bearings or angular contact ball bearings, require a defined axial bearing prestress for optimum bearing properties and bearing service life. This is normally applied by appropriate axial prestress elements, such as axle nuts. In order to be able to set a particularly simply reproducible prestress during fabrication, a preferred development of the invention provides for the bearing rings to have extensions which run toward each other in order to set an axial spacing or prestress of the anti-friction bearings.

The mounting and dismounting are further facilitated, according to a preferred development of the invention, by the extensions being pre-joined to each other via a clip.

In order to implement a bearing arrangement that is closed with respect to the outside, according to a further preferred refinement of the invention, a peripheral seal is provided between the mutually facing end regions of the extensions.

A subassembly in aircraft landing gear which is particularly demanding and in need of maintenance is the brake arrangement. This usually comprises a plurality of brake disks rotatably fixedly coupled to the rim and brake blocks located alternatingly between the latter in the axial direction and rotatably fixedly arranged. During operational braking, the brake blocks are loaded with an axial force which, in order to ensure an adequate braking effect, must be absorbed by a counter-mounting or a counter-bearing. In this context a preferred refinement of the invention provides for a counter-bearing to be detachably fixed to the outer ring bearing housing and to absorb the axial force applied by a disk brake arrangement during braking. The detachable arrangement of the counter-bearing provides the advantage that, in order to replace the brake linings or the brake disks, it is not necessary for the entire brake caliper of the brake arrangement to be dismounted; instead, following the dismounting of the rim, the components to be replaced can be removed or refitted in the axial direction.

According to a further refinement of the invention, the outer anti-friction bearing of the wheel bearing has a greater diameter. As a result, on the one hand the load-bearing force of the bearing is increased and, on the other hand, any relatively high torques acting on the wheel bearing transversely with respect to the wheel axle—for example in the event of a crosswind landing—can be absorbed by the bearing.

In order to implement an arrangement with a high load-bearing capacity that is particularly compact in the radial direction, in a further advantageous refinement according to the invention, a provision is made for the bearing arrangement to be arranged beside the brake arrangement as seen in the axial direction.

In applications in which, although there is a comparatively large radial space, and at the same time a restricted axial space being available for the wheel bearing, a refinement of the invention is advantageous in which the bearing arrangement is surrounded by the brake arrangement.

These and other objects and advantages of the present invention will be readily appreciable from the following description of preferred embodiments of the invention and from the accompanying drawings and claims.

DETAILED DESCRIPTION OF THE PREFERRED EMBODIMENTS

In the figures, identical or functionally identical elements are provided with the same designations.

Figure 1:
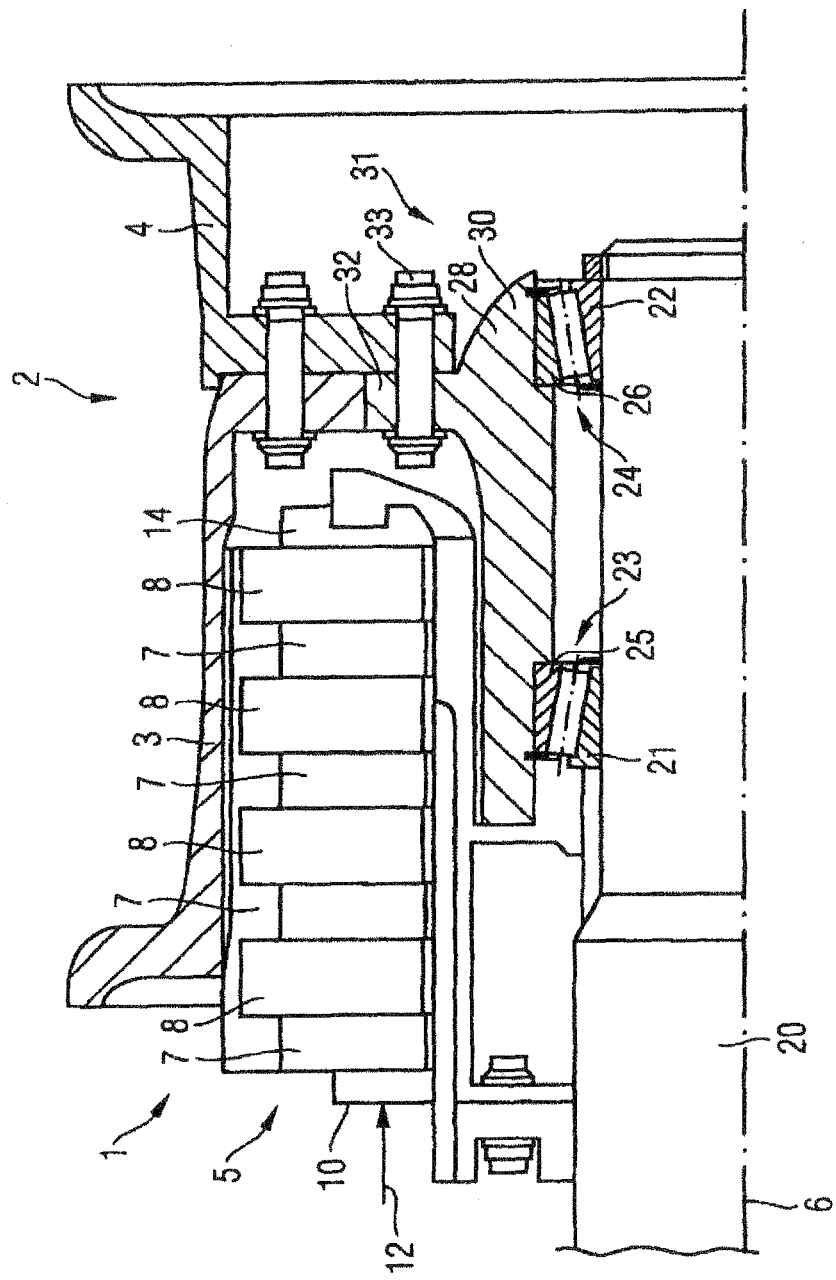
FIG. 1 shows a first wheel bearing according to the invention for an aircraft landing gear.

FIG. 1 shows a wheel bearing 1 according to the invention of an aircraft landing gear. The wheel bearing comprises a two-part rim 2, onto which a tire, not illustrated, is fitted and which is assembled from two rim parts 3, 4. The rim parts 3, 4 are joined to each other by connecting screws provided on the circumference and thus form an independent structural unit.

By way of illustration, a brake arrangement 5 can be seen, which is formed from brake linings or brake blocks 7 and brake disks 8 arranged alternatingly along the longitudinal axis 6. The brake arrangement 5 can be pressurized in the axial direction via a ram 10, shown by way of illustration, by a corresponding axial braking force 12 being exerted on the arrangement. In order to absorb the opposing force, a counter-bearing 14 is provided on the other side of the brake arrangement 5.

A stub axle or a hollow axle 20 of the aircraft landing gear, otherwise not specifically illustrated, bears inner rings 21, 22 of two anti-friction bearings 23, 24 arranged axially spaced apart. The anti-friction bearings 23, 24 are configured as tapered roller bearings in the exemplary embodiments. In principle, however, other bearings, for example angular contact ball bearings, can also be used.

The bearing outer rings 25, 26 of the anti-friction bearings 23, 24 are jointly accommodated in a one-piece outer ring bearing housing 28. For example, the outer bearing rings 25, 26 can be pressed into the housing 28. The inner ring 22 of the anti-friction bearing 24 is fixed on the axle 20 in a manner known per se with an axle nut.

In this configuration, the outer ring bearing housing 28 forms the part 30 which can be rotated—seen in relation to the stationary axle 20—of the bearing arrangement 31. The rim 2 is detachably joined to a flange-like peripheral extension 32 extending radially outward and belonging to the bearing housing 28, by means of a plurality of screws 33 arranged on a pitch circle.

For the purpose of mounting and dismounting, for example within the context of maintenance and inspection work, the rim 2 can be removed axially to the right from the wheel bearing or the axle 20 in one piece as a structural unit by loosening the screws 33. The brake arrangement 5 is therefore easily accessible. In addition, the outer ring bearing housing forms a structural unit which is simple to handle during the mounting and which, in order to fulfill the actual rotational mounting, comprises only a comparatively few individual parts to be mounted.

Figure 2:
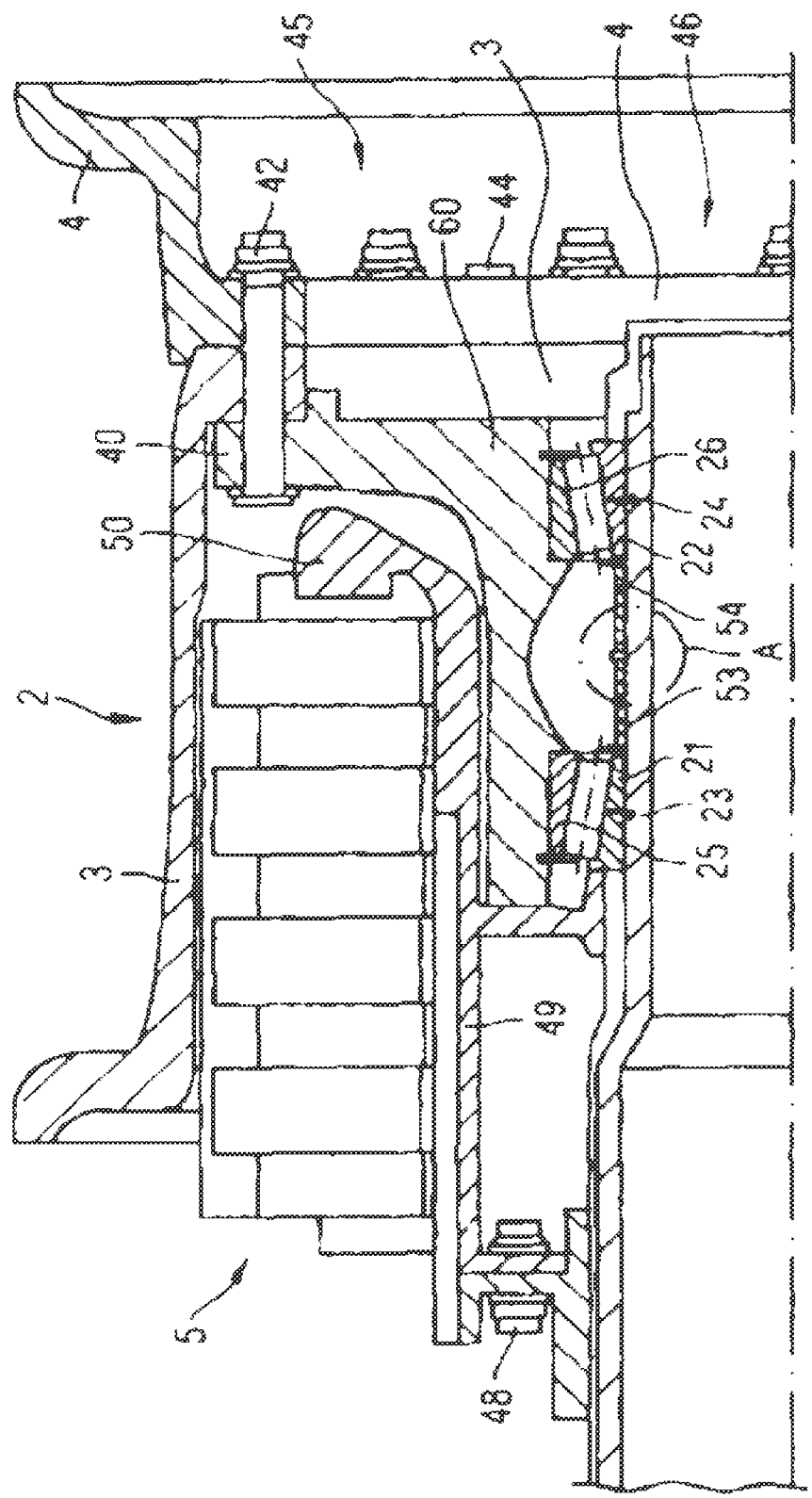
FIG. 2 shows a second wheel bearing according to the invention.

FIG. 2 shows a variant of a wheel bearing according to the invention. The outer ring bearing housing 40 shown in FIG. 2 is modified in as much as it extends radially further outward than the bearing housing 28 in FIG. 1. By means of a plurality of screws 42 distributed on the outer pitch circle circumference, the two-part rim 2 with its rim parts 3 and 4 is detachably joined to the outer ring bearing housing 40. The rim parts 3 and 4 are pre-joined by screw connections 44 that are merely indicated, forming a structural unit.

Here, too, the outer ring bearing housing forms the rotating part 45 of the bearing arrangement 46. Here, a counter-bearing 50 is provided in a stationary base area 49, joined by a screw fixing 48, in order to absorb the axial force exerted by the brake arrangement 5 during operational braking.

Figure 3:
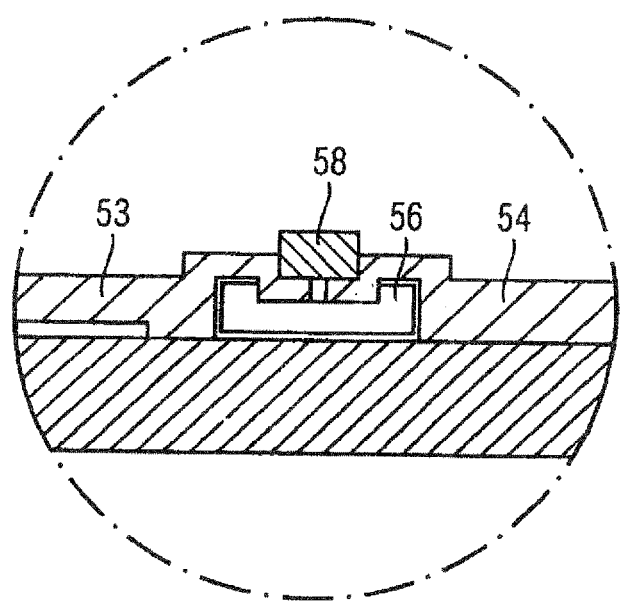
FIG. 3 shows the detail A from FIG. 2.
Figure 4:
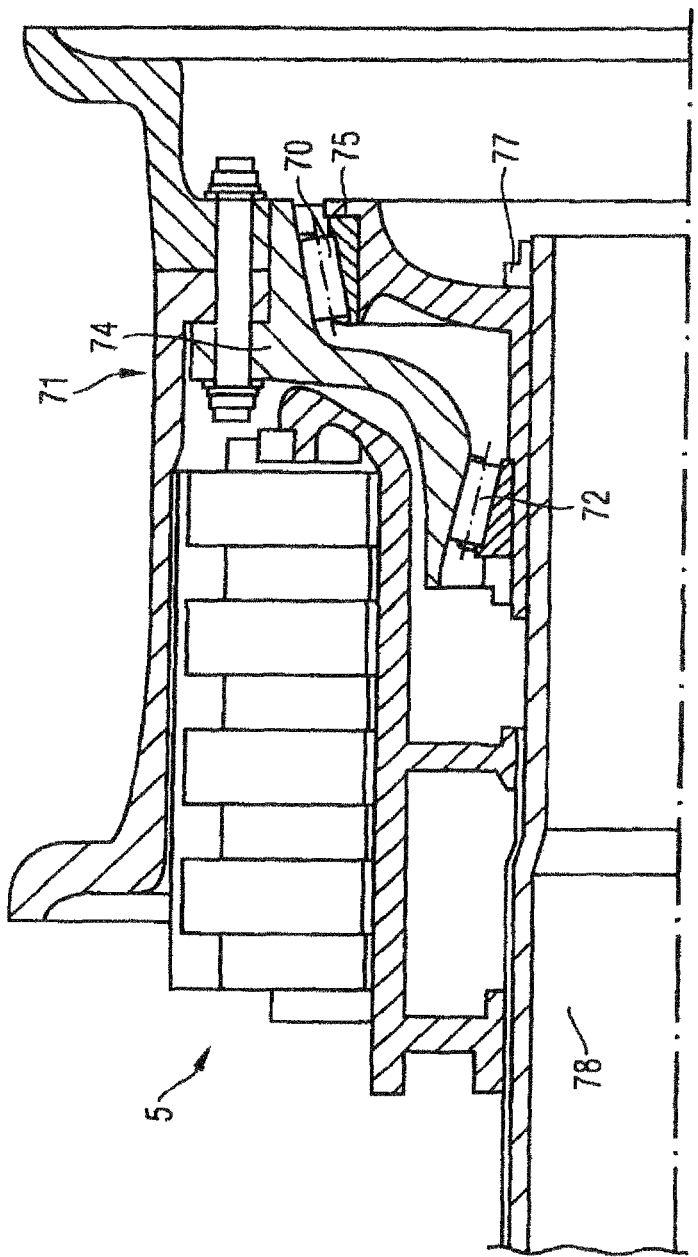
FIG. 4 shows a third wheel bearing according to the invention.

The bearing arrangement 46 has a modification with regard to the bearing inner rings 21, 22, in as much as the latter are each provided with an axial extension 53, 54. The extensions 53, 54, facing each other axially, form spacers for setting an axial distance between the anti-friction bearings 23, 24. The extensions 53, 54 are pre-joined to each other via a clip 56, as the detail view A illustrated enlarged in FIG. 3 indicates. The clip holds the two extensions in position and clamps a peripheral seal 58 between them. Therefore, in an advantageous way, the bearing arrangement 46 is formed as a closed unit protected against contamination and against the penetration of media from outside. The bearing inner rings 21, 22—and the running surfaces formed by the latter for the anti-friction elements—can advantageously be formed integrally from the material 60 of the outer ring bearing housing FIG. 4 shows a modified wheel bearing according to the invention which, in the axial direction, is constructed more compactly and is particularly capable of bearing a load and absorbing torques as a result of the fact that the outer anti-friction bearing 70 of the bearing arrangement 71 has a greater diameter than the inner anti-friction bearing 72. To this end, the outer ring bearing housing 74 is formed with a step, so to speak, the bearing part of the inner rings of the anti-friction bearings having a corresponding stepped portion 75. The inner part is fixed on the hollow axle 78 of the wheel bearing via an axle nut 77.

Figure 5:
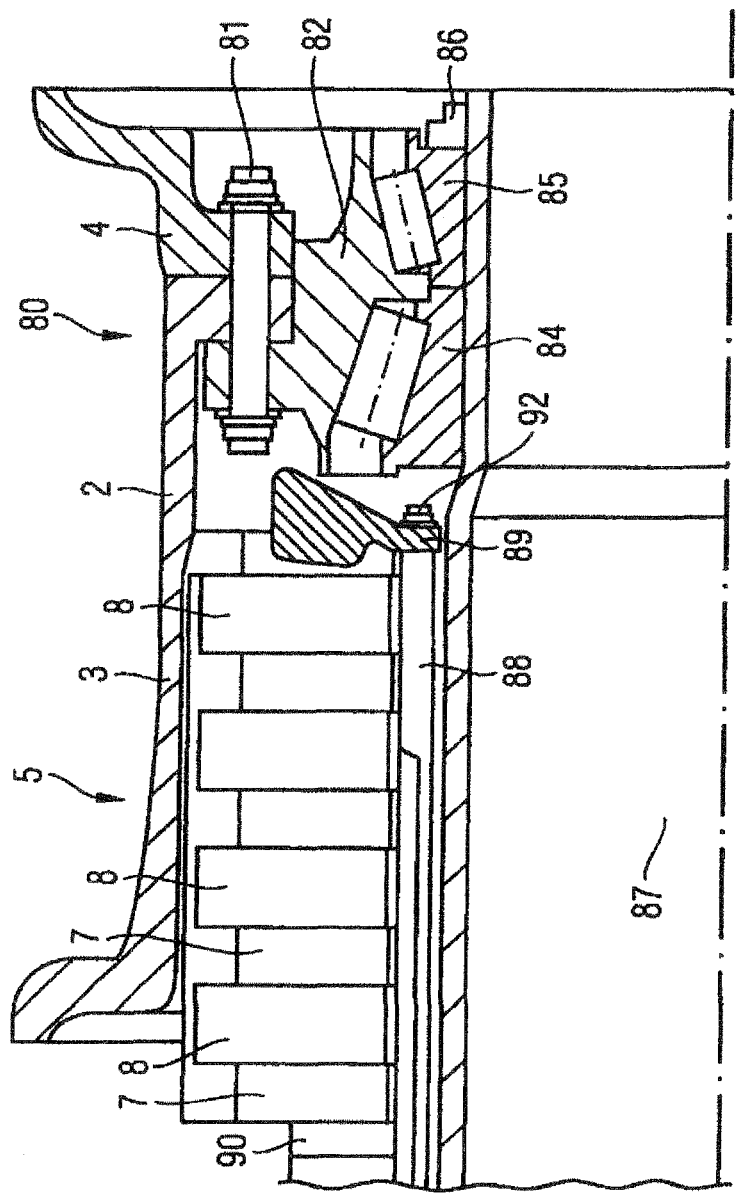
FIG. 5 shows a fourth wheel bearing according to the invention.

In the embodiment shown in FIG. 5 of a wheel bearing according to the invention, the bearing arrangement 80 is arranged laterally beside the brake arrangement 5 in the axial direction. Here, too, the rim 2 with its two rim parts 3, 4 is joined to the outer ring bearing housing 82 via a plurality of axial screws 81 arranged on the pitch circle. The bearing inner rings 84, 85 are fixed on an axle 87 in a manner known per se by an axle nut 86. For the purpose of dismounting, the screw connection 81 is released and the rim 2 can then be removed axially to the right. It therefore not only exposes the brake arrangement 5 but also, in this exemplary embodiment, a counter-bearing 89 detachably fixed to a support 88. The counter-bearing, as already previously described, is used to absorb the braking forces applied by a brake ram 90 and transmitted via the brake linings/brake blocks 7 and brake disks 8.

This configuration is particularly advantageous for the brake inspection and maintenance, since the counter-bearing 89 detachably fixed via a screw connection 92 can be removed simply by loosening the connection 92, and, therefore, the brake disks and brake linings are accessible axially and can be removed from the brake arrangement 5. For the purpose of torque-transmitting fixing of the brake blocks 7 on the one hand and the brake disks 8 on the other hand, these can have axial recesses or grooves distributed over the periphery, in which corresponding webs on the rims and the rotating elements, on the one hand, and corresponding webs or projections of a brake caliper or of the support 88, on the other hand, engage.

Figure 6:
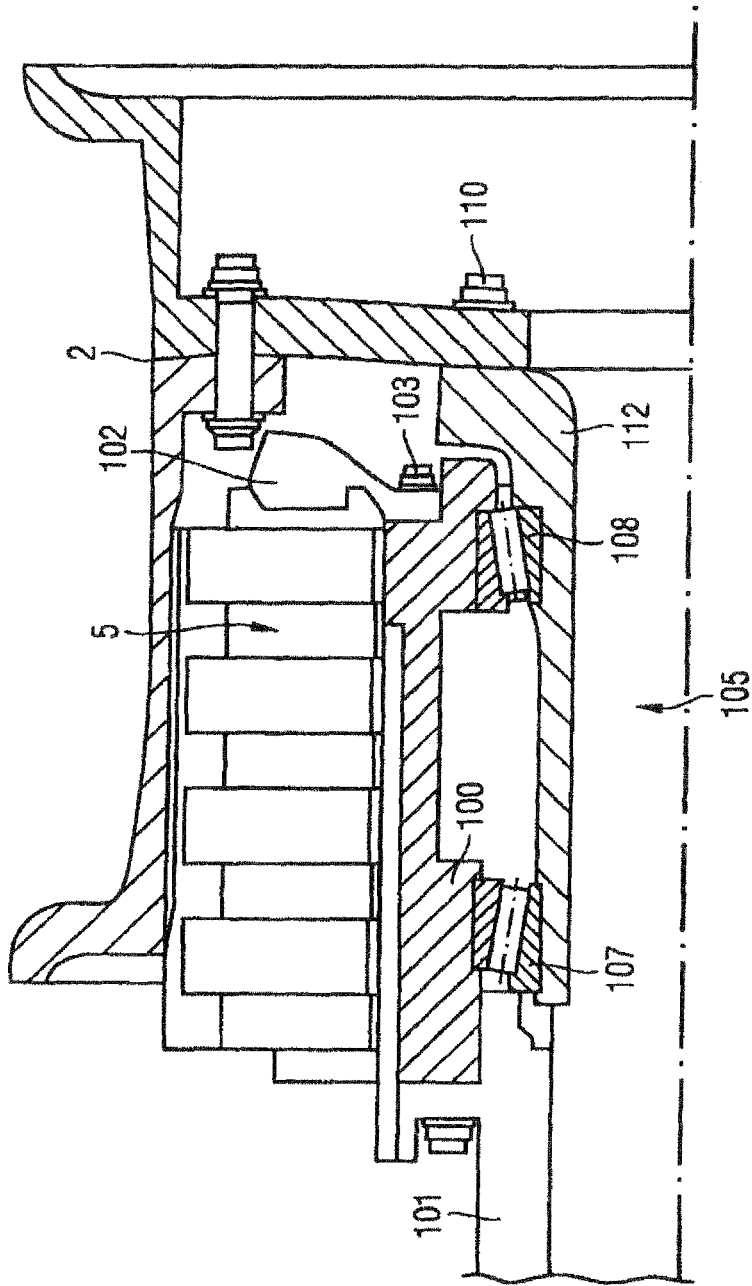
FIG. 6 shows a fifth wheel bearing according to the invention.
Figure 7:
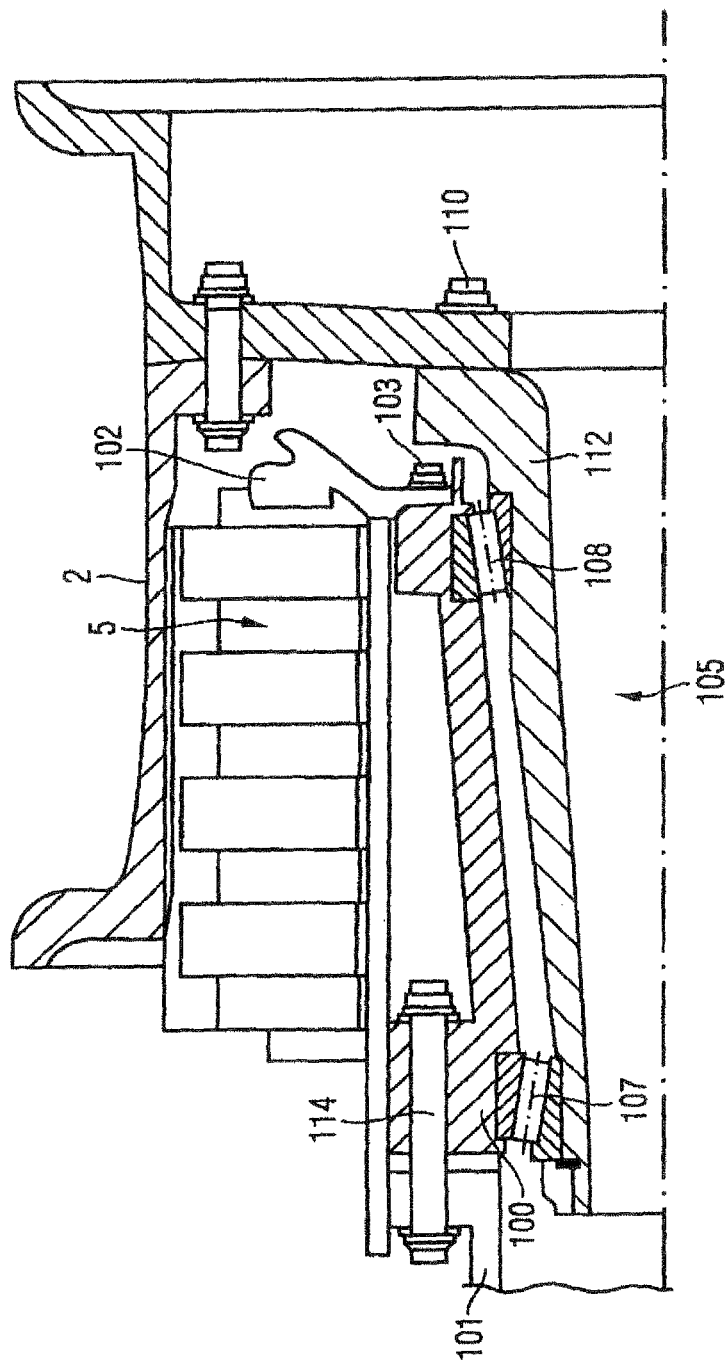
FIG. 7 shows a sixth wheel bearing according to the invention.

The variants according to FIGS. 6 to 9 show wheel bearings according to the invention in which the outer ring bearing housing 100 is in each case fixed to a hollow axle 101 or a stub axle rotatably fixed. In the manner described previously, in each case a counter-bearing 102 is detachably fixed to the outer ring bearing housing 100 via a screw connection 103 in the manner and with the advantages as previously already described (FIGS. 6 and 7). Alternatively (FIGS. 8 and 9), the counter-bearing 102 can also be fixed to the hollow axle 101.

In a further common feature in the exemplary embodiments according to FIGS. 6 to 9, the bearing arrangement 105 is, so to speak, arranged completely inside the brake arrangement 5. Therefore, despite a comparatively wider spacing of the anti-friction bearings 107, 108, a design of the wheel bearing that is very compact in the axial direction can be implemented.

As illustrated by FIG. 7, for example, in the event of loosening the screw connection 110, indicated only schematically, between the rim 2 and an inner hollow axle 112, which is mounted via the anti-friction bearings 107 and 108 such that it can rotate with respect to the outer ring bearing housing 100, particularly good access to the brake arrangement 5 is possible. The embodiment shown in FIG. 7 also has the additional advantage that, following the dismounting of the rim 2 and of the counter-bearing 102 and removal of the brake arrangement 5, a connecting screw 114, via which the outer ring bearing housing 100 is screwed to the hollow axle 101, also becomes accessible from the right-hand side.

Figure 8:
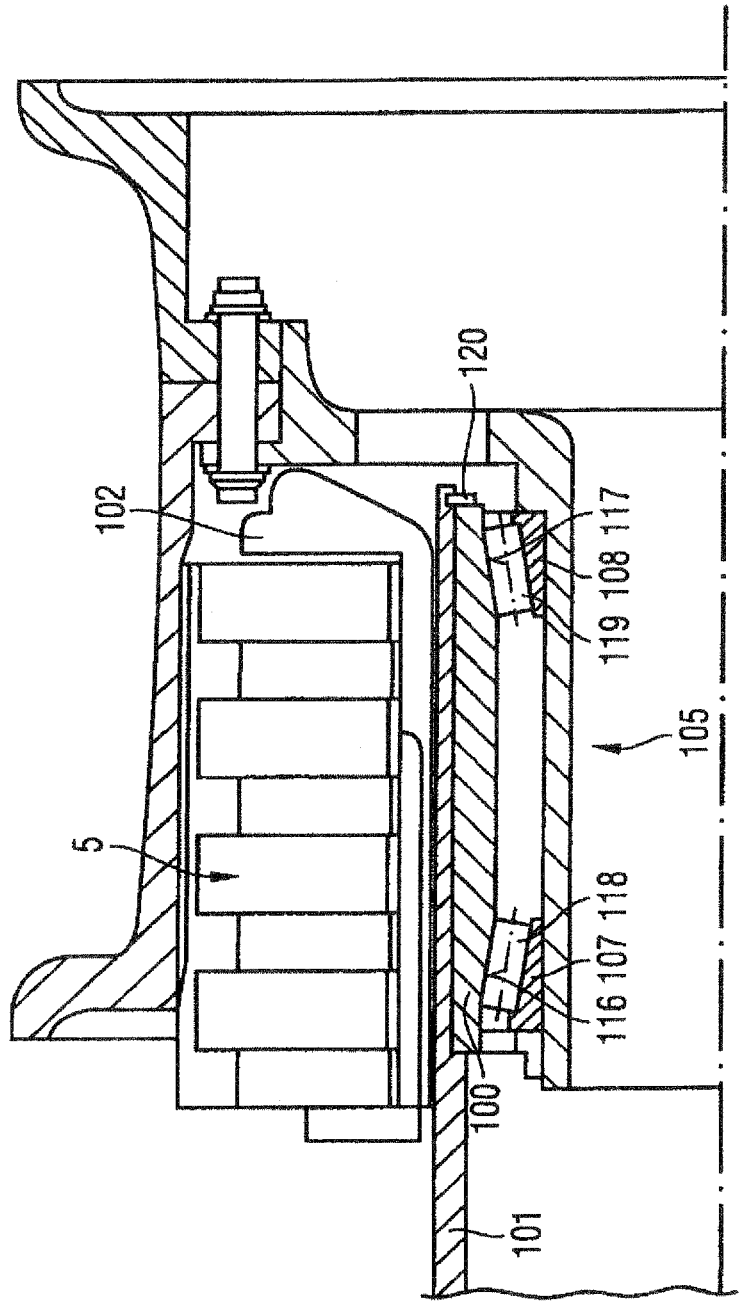
FIG. 8 shows a seventh wheel bearing according to the invention.

FIG. 8 shows a further form of configuration in which, in the outer ring bearing housing 100, running surfaces 116, 117 for the anti-friction elements 118, 119 of the anti-friction bearings 107, 108 are integrally formed at the same time. The outer ring bearing housing 100 is fixed, for example via a screw fixing or a circlip 120, in the hollow axle 101 serving as a support. With this form of configuration according to FIGS. 8 and 9, the brake arrangement 5 can be implemented as what is known as a "floating" brake caliper even without a specific brake caliper base.

Figure 9:
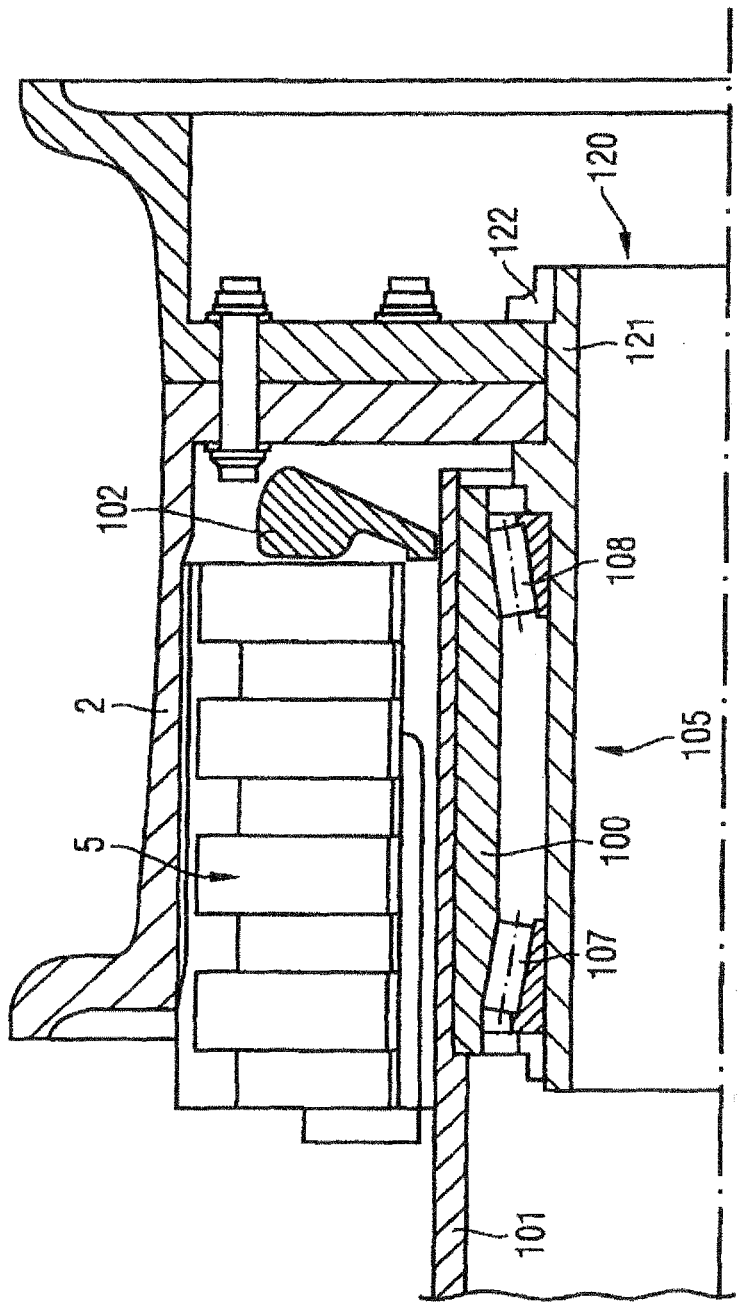
FIG. 9 shows an eight wheel bearing according to the invention.

FIG. 9 shows a further special feature with regard to the fixing of the rim in the rotatable region of the bearing arrangement, which, in this example, is formed by the inner hollow axle 121. To be specific, the rim 2 here is screwed to the hollow axle 121 in a particularly simple way via an axle nut 122.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF DESIGNATIONS

A Detail view from FIG. 2
1 Wheel bearing
2 Rim
3, 4 Rim parts
5 Brake arrangement
6 Longitudinal axis
7 Brake linings/brake blocks
8 Brake disks
10 Ram
12 Braking force
14 Counter-bearing
20 Stub axle/hollow axle
21, 22 Inner rings
23, 24 Anti-friction bearings
25, 26 Bearing outer rings
28 Outer ring bearing housing
30 Axle nut
31 Rotatable part
32 Extension
33 Screws
40 Outer ring bearing housing
42 Screw joints
44 Screw connections
45 Rotating part
46 Bearing arrangement
48 Screw joint
49 Base area
50 Counter-bearing
53, 54 Extensions
56 Clip
58 Seal
60 Material of the outer ring bearing housing
70 Outer anti-friction bearing
71 Bearing arrangement
72 Inner anti-friction bearing
74 Outer ring bearing housing
75 Stepped portion
77 Axle nut
78 Hollow axle
80 Bearing arrangement
81 Screw joint
82 Outer ring bearing housing
84, 85 Bearing inner rings
86 Axle nut
87 Axle
88 Support
89 Counter-bearing
90 Brake ram
92 Screw connection
100 Outer ring bearing housing
101 Hollow axle
102 Counter-bearing
103 Screw connection
105 Bearing arrangement
107, 108 Anti-friction bearings
110 Screw connection
112 Hollow axle
114 Connecting screw
116, 117 Running surfaces
118, 119 Anti-friction elements 120 Circlip
121 Inner hollow axle
122 Axle nut

The invention claimed is:

1. A wheel bearing assembly for an aircraft landing gear rotating about an axle, comprising:
   a single rim having a first part and a second part, said single rim arranged to support a single tire, said first rim part and said second rim part connected to one another by a first connection;
   a one-piece outer ring bearing housing connected to said first and second rim parts by a second connection, said second connection arranged radially outward of and substantially parallel to said first connection; and
   a bearing arrangement comprising a pair of anti-friction bearings mounted in said housing and arranged for rotation with respect to said axle.

2. The wheel bearing recited in claim 1, wherein the outer ring bearing housing forms a rotatable part of the bearing arrangement.

3. The wheel bearing recited in claim 1, wherein a counter-bearing is detachably fixed to the outer ring bearing housing and absorbs an axial force applied by a disk brake arrangement during braking.

4. The wheel bearing recited in claim 3, wherein the bearing arrangement is surrounded by the brake arrangement.

5. The wheel bearing assembly recited in claim 1, wherein the second connection includes a threaded fastener.

6. The wheel bearing assembly recited in claim 1, wherein bearing inner rings of the anti-friction bearings comprise:
   extensions which run toward each other and are used to set an axial spacing or prestress of the anti-friction bearings,
   a peripheral seal comprising a single-part seal accommodated between and in contact with respective end regions of the extensions, and
   a clip holds the extensions in position so that the peripheral seal is clamped between the extensions.

* * * * *